United States Patent
Hayashida et al.

(10) Patent No.: US 11,198,364 B2
(45) Date of Patent: Dec. 14, 2021

(54) DISPOSITION STRUCTURE OF DISPLAY FOR VEHICLE

(71) Applicant: HONDA MOTOR CO., LTD., Tokyo (JP)

(72) Inventors: Yoshimasa Hayashida, Wako (JP); Akinori Myoi, Wako (JP); Susumu Seki, Wako (JP); Yasuyuki Shigefuji, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 56 days.

(21) Appl. No.: 16/744,443

(22) Filed: Jan. 16, 2020

(65) Prior Publication Data
US 2020/0269697 A1 Aug. 27, 2020

(30) Foreign Application Priority Data
Feb. 26, 2019 (JP) .............................. JP2019-032990

(51) Int. Cl.
*B60K 37/02* (2006.01)
*G08G 1/16* (2006.01)

(52) U.S. Cl.
CPC ........ *B60K 37/02* (2013.01); *B60K 2370/152* (2019.05); *B60K 2370/1526* (2019.05);
(Continued)

(58) Field of Classification Search
CPC .............. B60K 37/02; B60K 2370/152; B60K 2370/1526; B60K 2370/682;
(Continued)

(56) References Cited

U.S. PATENT DOCUMENTS

| | | | |
|---|---|---|---|
| 6,448,893 B1 * | 9/2002 | Dobberkau ............ | B60K 35/00 340/461 |
| 6,720,937 B1 * | 4/2004 | Neugart ................ | B60K 37/02 345/1.1 |

(Continued)

FOREIGN PATENT DOCUMENTS

| DE | 299 08 072 | 9/1999 |
|---|---|---|
| DE | 100 39 760 | 3/2002 |

(Continued)

OTHER PUBLICATIONS

German Office Action, dated Jan. 13, 2021, English translation included, 22 pages.

(Continued)

*Primary Examiner* — Patrick N Edouard
*Assistant Examiner* — Douglas M Wilson
(74) *Attorney, Agent, or Firm* — Rankin, Hill & Clark LLP (57) ABSTRACT

A pair of outside view displays that are provided on an instrument panel, are located outside a steering in a vehicle width direction, and display captured outside view images and displays that are provided inside the outside view displays in the vehicle width direction and have display regions from a driver seat to a front passenger seat are provided, and the outside view displays are provided so as to face the inside in the vehicle width direction and are disposed such that inner ends of the outside view displays are located on a front side of the vehicle relative to closer left and right ends of the displays.

7 Claims, 6 Drawing Sheets

(52) U.S. Cl.
CPC ... *B60K 2370/682* (2019.05); *B60R 2300/802* (2013.01); *B60R 2300/804* (2013.01); *B60R 2300/8026* (2013.01); *B60R 2300/8046* (2013.01); *B60R 2300/8066* (2013.01); *G08G 1/167* (2013.01); *G09G 2380/10* (2013.01)

(58) Field of Classification Search
CPC .... B60K 2370/176; B60K 35/00; B60R 1/04; B60R 2300/802; B60R 1/00; B60R 2300/8026; B60R 2300/8046; B60R 2300/804; B60W 50/14; G08G 1/167
See application file for complete search history.

(56) References Cited

U.S. PATENT DOCUMENTS

| | | | | |
|---|---|---|---|---|
| 2009/0096597 | A1* | 4/2009 | Avery, Jr. | G08G 1/0962 340/435 |
| 2015/0085117 | A1* | 3/2015 | Chang | H04N 7/183 348/148 |
| 2017/0364148 | A1* | 12/2017 | Kim | G06F 3/1454 |
| 2018/0131877 | A1* | 5/2018 | Amano | H04N 5/243 |
| 2018/0265002 | A1* | 9/2018 | Kawamoto | H04N 5/23238 |
| 2019/0375292 | A1* | 12/2019 | Saito | B60K 37/06 |
| 2020/0039440 | A1* | 2/2020 | Ozawa | B60R 1/12 |
| 2020/0079307 | A1* | 3/2020 | Asai | B60R 1/00 |
| 2020/0207271 | A1* | 7/2020 | Iida | H04N 5/23245 |

FOREIGN PATENT DOCUMENTS

| | | | |
|---|---|---|---|
| DE | 10 2014 226 730 | 6/2016 | |
| DE | 102014226730 A1 * | 6/2016 | .............. B60R 1/00 |
| DE | 10 2019 215 481 | 4/2020 | |
| JP | H07-223487 | 8/1995 | |
| JP | H07223487 * | 8/1995 | .............. B60R 1/00 |
| JP | 2010-146136 | 7/2010 | |
| JP | 2016-121945 A | 7/2016 | |
| JP | 2016-136115 A | 7/2016 | |
| JP | 2016-203786 A | 12/2016 | |

OTHER PUBLICATIONS

Japanese Decision of Refusal with English translation dated Oct. 27, 2020, 6 pages.
Japanese Office Action dated Aug. 4, 2020, English abstract included, 5 pages.

* cited by examiner

FIG.6

DISPOSITION STRUCTURE OF DISPLAY FOR VEHICLE

INCORPORATION BY REFERENCE

The present application claims priority under 35 U.S.C. § 119 to Japanese Patent Application No. 2019-032990 filed on Feb. 26, 2019. The content of the applications is incorporated herein by reference in its entirety.

BACKGROUND OF THE INVENTION

Field of the Invention

The present invention relates to a disposition structure of a display for a vehicle.

Description of the Related Art

In the related art, a disposition structure in which an outside view display (camera monitor display) is disposed on an instrument panel of a vehicle is known (see Japanese Patent Laid-Open No. 2010-146136, for example).

However, since an angle of the outside view display is not oriented to a driver in the disposition structure of the display for a vehicle, visibility of the outside view display is degraded.

The invention was made in view of the aforementioned background, and an object thereof is to provide a disposition structure that improves visibility of outside view displays and that achieves a sense of unity with another display such as a display audio or a meter, for example.

SUMMARY OF THE INVENTION

An aspect of the invention includes: a pair of outside view displays that are provided on an instrument panel, are located outside a steering in a vehicle width direction, and display captured outside view images; and a display that is provided inside the outside view display in the vehicle width direction and has a display region from a driver seat to a front passenger seat, and the outside view displays are provided so as to face the inside in the vehicle width direction and are disposed such that inner ends of the outside view displays are located on a front side of the vehicle relative to closer left and right ends of the display.

According to the aspect, since the outside view displays face the inside of the vehicle, visibility (reduction of background reflection and an increase in visible area) of the outside view displays is improved.

Since vehicle inner parts of the outside view displays extend into the front side of the vehicle relative to the display, disposition that achieves a sense of unity with the display can be achieved.

According to another aspect of the invention, display regions of the outside view displays are provided outside the left and right ends of the display in the vehicle width direction at distances from the left and right ends, respectively.

According to the aspect, disposition with a sense of unity with the outside view displays is seen when a driver sees the outside view display on the front passenger seat side. When the outside view display on the driver seat side is seen, a distance is generated between the outside view display and the display, and it is possible to prevent the display from being hidden by a steering if the steering is disposed at the portion of the distance.

According to another aspect of the invention, a gripping portion of the steering is located between a vehicle width outer end of the display region of the display and a vehicle width inner portion of the display region of the outside view display for the driver seat.

According to the aspect, a probability that the outside view display is hidden by hands of a passenger who grips the steering can be reduced.

According to another aspect of the invention, the outside view displays include cover members that cover surroundings of the display regions of the outside view displays, respectively, and appearances of the cover members have left-right inverted shapes.

According to the aspect, it is possible to unify left and right designs and also to realize both visibility of the outside view displays and a sense of unity of the outside view displays and the display.

According to another aspect of the invention, lower ends of the display regions of the outside view displays are each disposed so as to be located above a lower end of the display region of the display.

According to the aspect, since the lower ends of the display regions of the outside view displays are located further above the steering, a probability that the display regions of the outside view displays are hidden by hands of a passenger can be reduced.

According to another aspect of the invention, indicators that include light emitting sections on rear surfaces and display information by the light emitting sections emitting light are provided below the outside view displays, respectively.

According to the aspect, a probability that light from the outside view displays enter the indicators decreases, a probability that the inside of the indicators are seen through is reduced, and it becomes easier to recognize whether or not the indicators are turned on.

According to the invention, since the outside view displays face the inside of the vehicle, visibility (reduction of background reflection and an increase in visible area) of the outside view displays is improved. Since the inner ends of the outside view displays extend into the front side of the vehicle relative to the display, a disposition with a sense of unity with the display is achieved.

DETAILED DESCRIPTION OF THE PREFERRED EMBODIMENTS

Hereinafter, an embodiment of the invention will be described with reference to drawings. The left, right, front, and back sides described in the specification refer the left, right, front, and back sides when seen from a driver seat.

Figure 1:
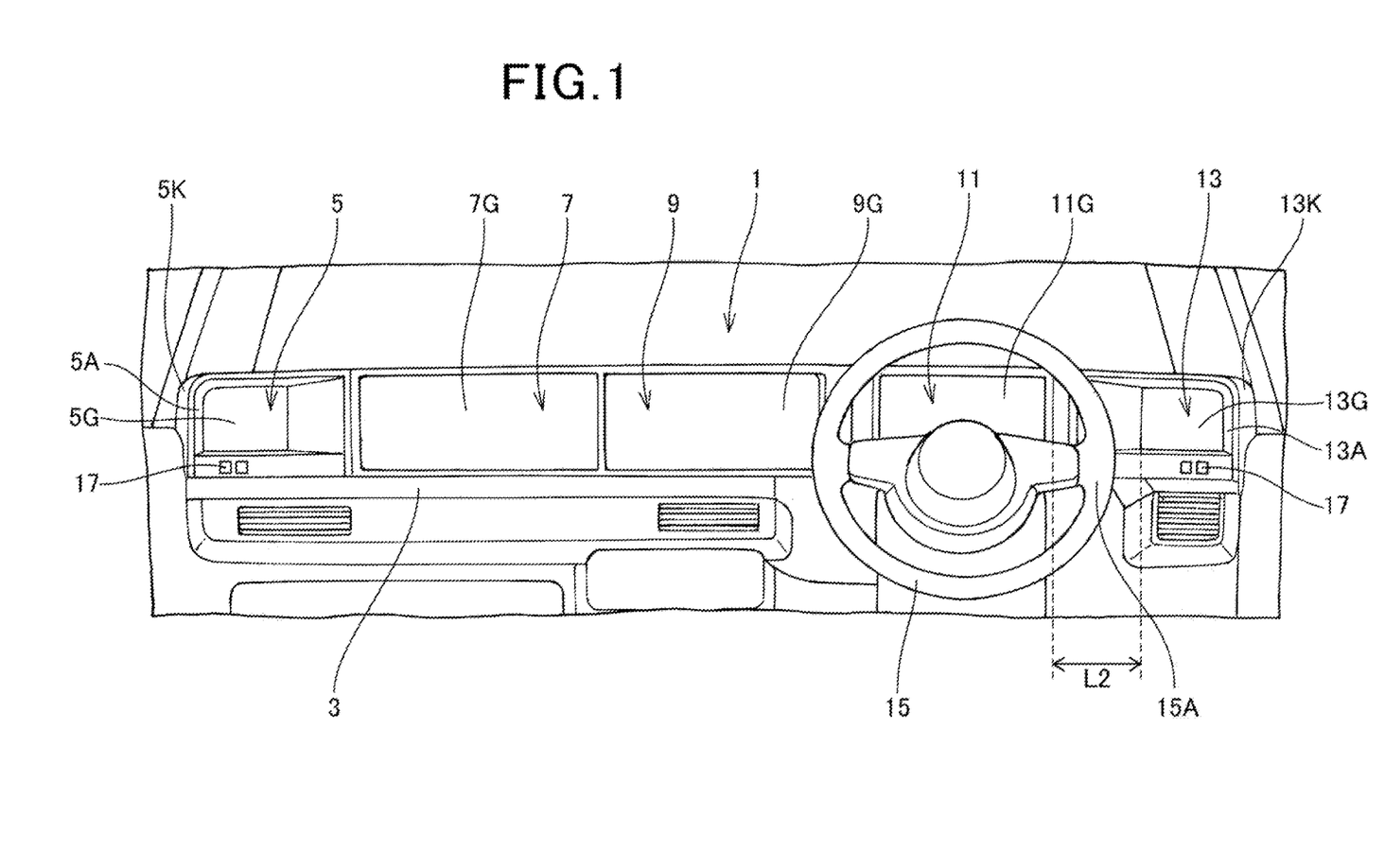
FIG. 1 is a view of an instrument panel when seen from a driver seat side.

FIG. 1 illustrates an instrument panel of a vehicle.

The instrument panel 1 is disposed in a state in which the instrument panel 1 transversely extends over the entire vehicle width above a front board 3 of the vehicle.

On the instrument panel 1, a left outside view display 5, a left display audio (display) 7 having a display region 7G, a right display audio (display) 9 having a display region 9G, a meter (display) 11 having a display region 11G, and a right outside view display 13 are disposed in this order from the left end in the drawing.

The pair of outside view displays 5 and 13 are provided on the instrument panel 1, are located outside a steering 15 in a vehicle width direction, and display captured outside view images.

The left outside view display 5 displays an image of a camera (not illustrated) that images a left rear side of the vehicle. The right outside view display 13 displays an image of a camera (not illustrated) that images a right rear side of the vehicle. The display audios 7 and 9 are navigations, and the meter 11 displays a vehicle speed, the amount of remaining fuel, a traveling distance, a clock time, and the like.

Figure 2:
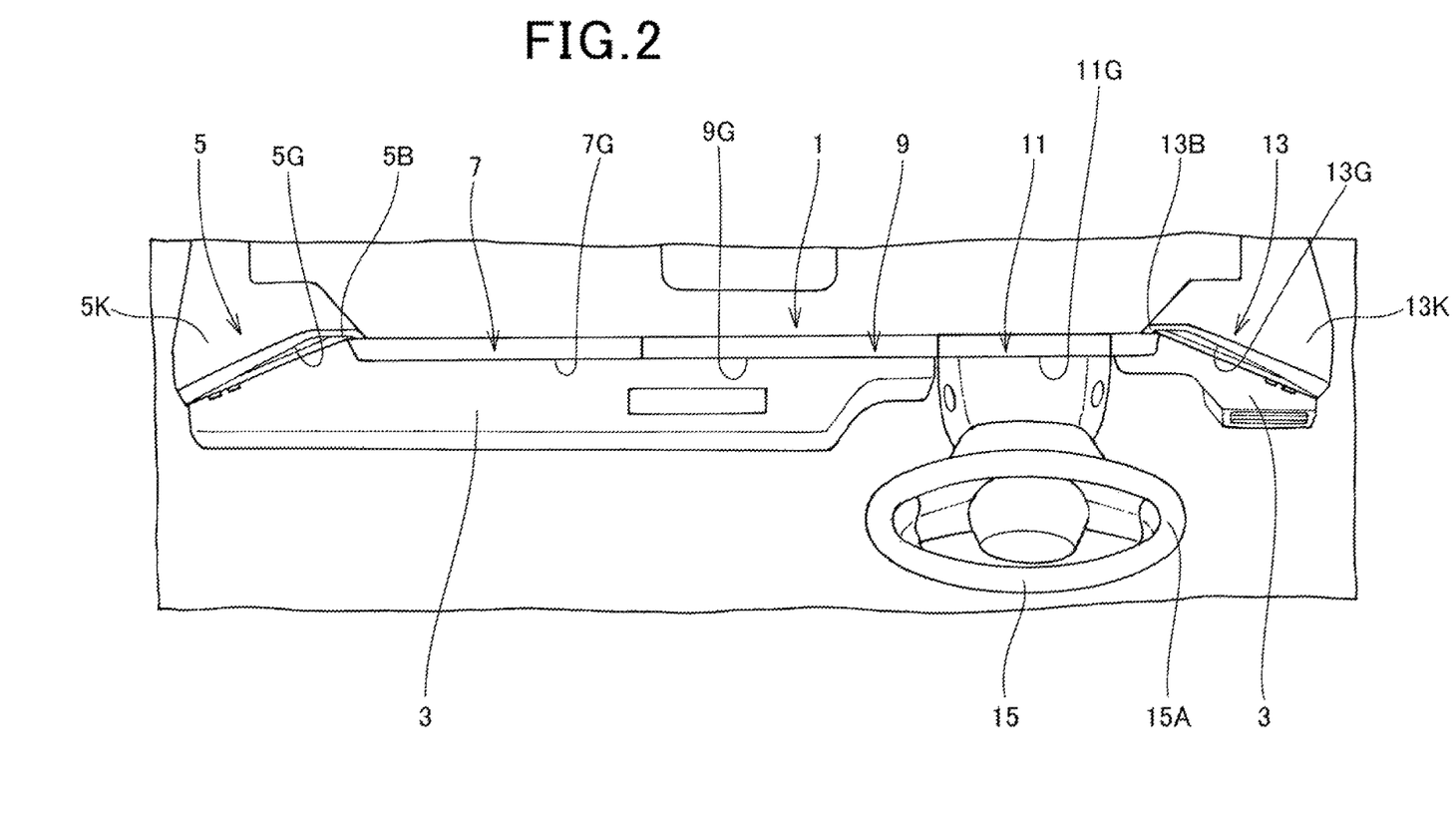
FIG. 2 is a view of the instrument panel when seen from above.

As illustrated in FIG. 2, the left display audio 7, the right display audio 9, and the meter 11 have display regions from the driver seat to a front passenger seat, which are successively provided inside the pair of left and right outside view displays 5 and 13 in the vehicle width direction.

The left display audio 7, the right display audio 9, and the meter 11 are disposed on a substantially straight line in a top view.

Figure 3:
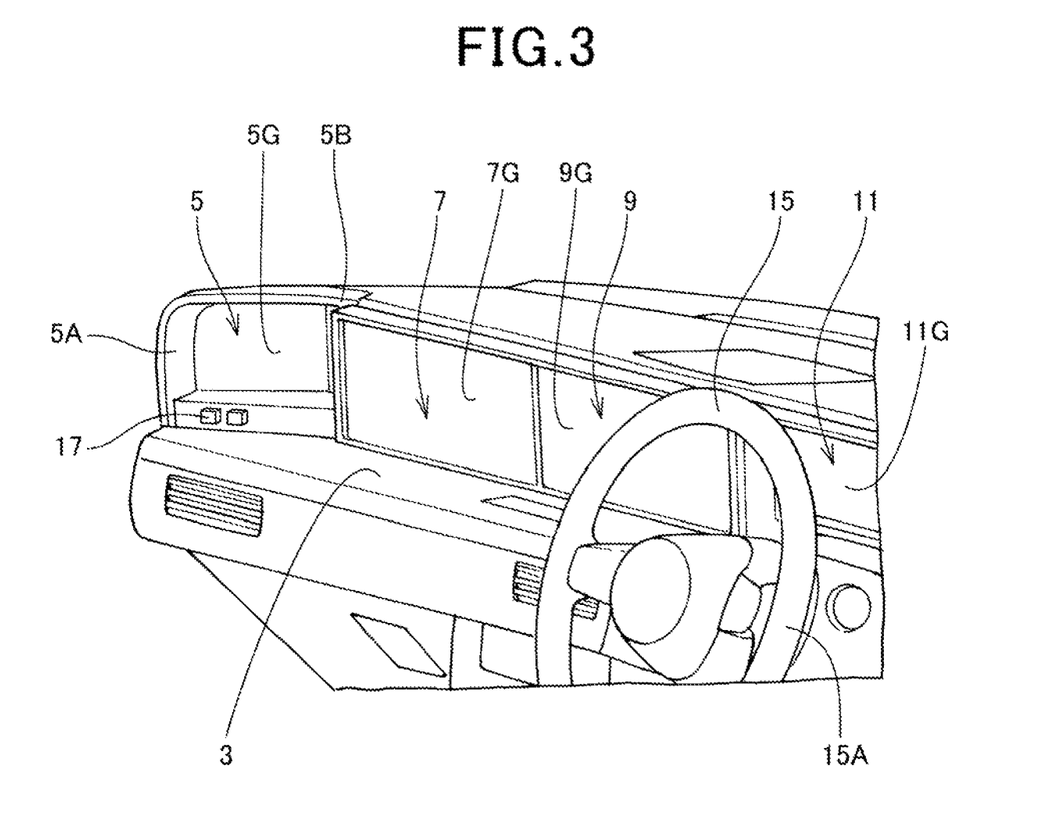
FIG. 3 is a view of the instrument panel when a front passenger seat side is seen from the driver seat.

The left outside view display 5 is obliquely disposed such that an outer end 5A of the outside view display 5 faces the inside of the vehicle as illustrated in FIG. 3. The outside view display 5 is disposed so as to extend into the front side of the vehicle relative to left and right ends of the left display audio 7 such that an inner end 5B of the outside view display 5 is hidden on a rear side of a closer left end of the left display audio 7.

Figure 4:
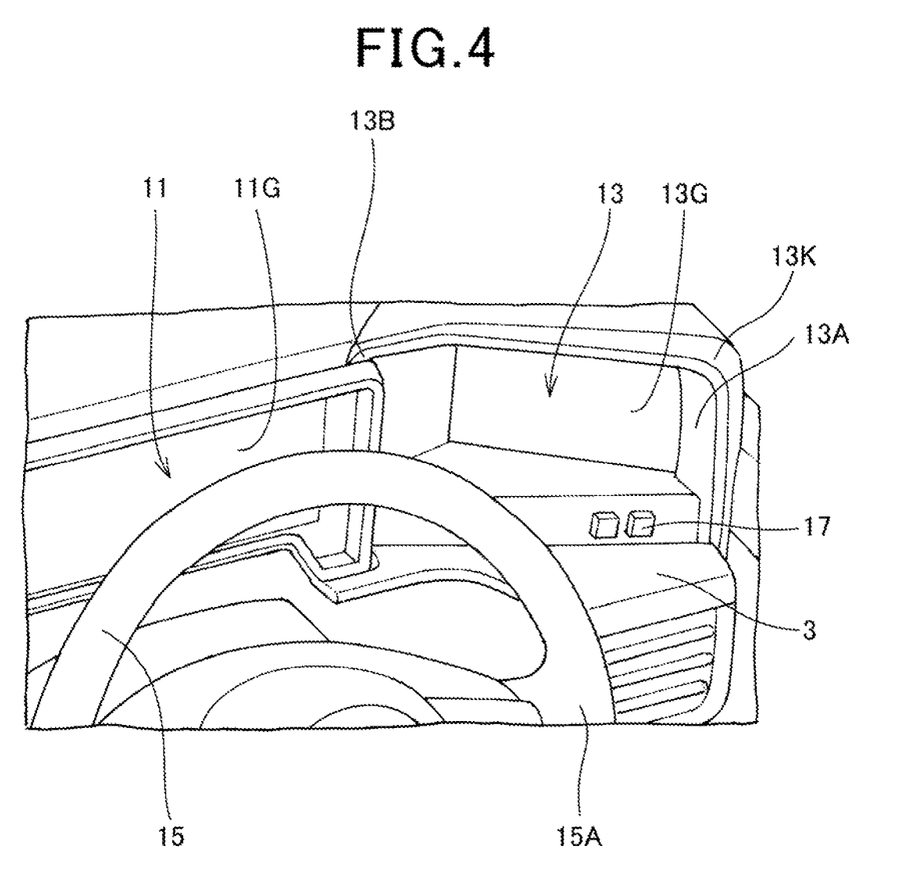
FIG. 4 is a view of the instrument panel when the driver seat side is seen from the driver seat.

The right outside view display 13 is obliquely disposed such that an outer end 13A of the outside view display 13 faces the inside of the vehicle as illustrated in FIG. 4.

Figure 5:
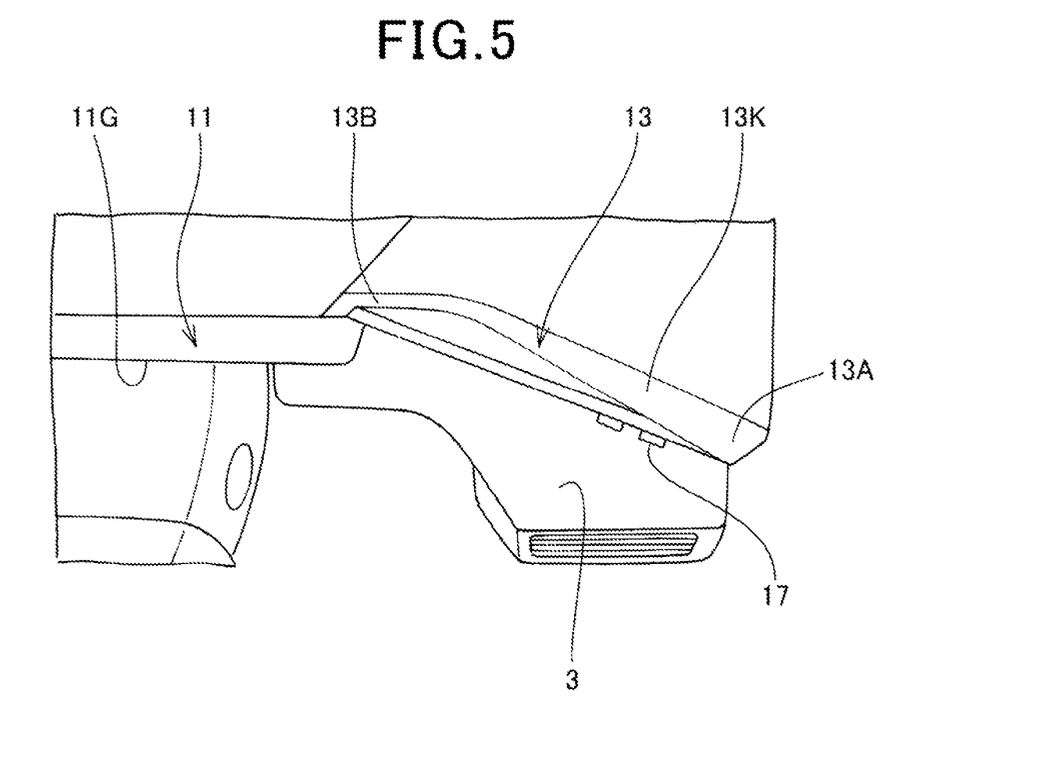
FIG. 5 is a view of a meter and outside view displays when seen from above.

The right outside view display 13 is disposed so as to extend into the front side of the vehicle relative to left and right ends of the meter 11 such that an inner end 13B of the outside view display 13 is hidden on a rear side of a closer right end of the meter 11 as illustrated in FIG. 5.

As illustrated in FIG. 1, the display region 5G of the left outside view display 5 is disposed outside left and right ends of the left display audio 7 in the vehicle width direction at a distance from the left and right ends.

Also, the display region 13G of the right outside view display 13 is disposed outside left and right ends of the meter 11 in the vehicle width direction at a distance from the left and right ends.

Figure 6:
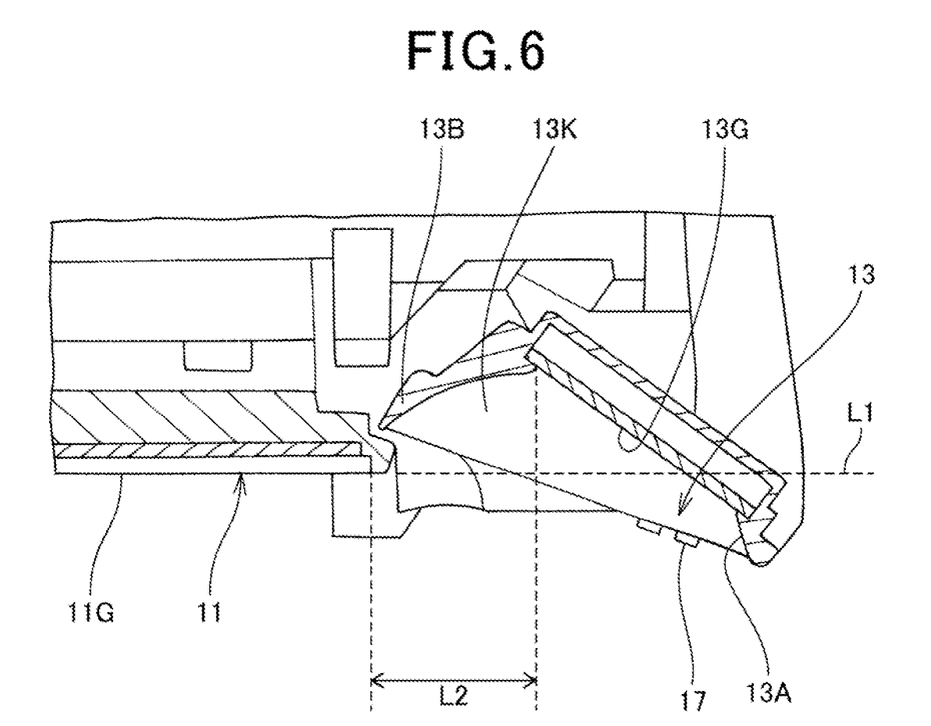
FIG. 6 is a partial sectional view of the meter and the outside view displays when seen from above.

For the driver seat, an inner end of the display region 13G extends into the front side of the vehicle from an extension line L1 of the meter 11 as illustrated in FIG. 6. A distance L2 is provided between the inner end of the display region 13G and the right end of the meter 11. A gripping portion 15A of the steering 15 is located in the distance L2 as illustrated in FIG. 1. Since the gripping portion 15A of the steering 15 is located in the distance L2, a probability that the display region 13G of the outside view display 13 is hidden by hands of a driver who grips the steering 15 when the outside view display 13 on the driver seat side is seen from the driver seat decreases.

As illustrated in FIG. 1, the left and right outside view displays 5 and 13 include cover members 5K and 13K that cover surroundings of the display regions 5G and 13G of the outside view displays 5 and 13. Appearances of the respective cover members 5K and 13K have left-right inverted symmetric shapes.

The display regions 5G and 13G of the outside view displays 5 and 13 are configured such that angles thereof directed to the driver can be adjusted inside the cover members 5K and 13K. The angles can be adjusted through an operation of a switch located near hands (not illustrated).

A lower end of the display region 5G of the left outside view display 5 is located above a lower end of the display region 7G of the left display audio 7. A lower end of the display region 13G of the right outside view display 13 is located above a lower end of the display region 11G of the meter 11.

Indicators 17 are provided below the left and right outside view displays 5 and 13. The indicators 17 are disposed at lower ends of the cover members 5K and 13K. The indicators 17 are, for example, blind spot monitors that include light emitting sections on rear surfaces thereof and display information by the light emitting sections emitting light.

In the embodiment, since the pair of outside view displays 5 and 13 face the inside of the vehicle as illustrated in FIGS. 3 and 4, visibility (reduction of background reflection and an increase in visible area) of the pair of outside view displays 5 and 13 when seen from the driver seat is improved. Also, since the inner end 5B of the outside view display 5 is disposed so as to extend into the front side of the vehicle relative to the left and right ends of the left display audio 7 such that the inner end 5B is hidden on the rear side of the left end of the left display audio 7, disposition with a sense of unity with the left display audio 7 can be achieved.

It is possible to reduce reflection of background although there is a probability that display of the left display audio 7 is reflected in the display region 5G of the outside view display 5 in a case in which the inner end 5B does not extend into the front side of the vehicle relative to the left display audio 7.

The same applies to the right outside view display 13.

Since the inner end 13B of the outside view display 13 is disposed so as to enter the front side of the vehicle relative to the left and right ends of the meter 11 such that the inner end 13B is hidden on the rear side of the right end of the meter 11, disposition with a sense of unity with the meter 11 can be achieved. It is possible to reduce reflection of background in the display region 13G of the outside view display 13 in the embodiment although there is a probability that display of the meter 11 is reflected in the display region 13G of the outside view display 13 in a case in which the inner end 13B does not extend into the front side of the vehicle relative to the meter 11.

In the embodiment, since the display regions 5G and 13G of the outside view displays 5 and 13 are provided outside the closer left and right ends of the display in the vehicle width direction at distances from the left and right ends as illustrated in FIG. 1, disposition with a sense of unity with the left display audio 7 is achieved when the outside view display 5 on the front passenger seat side is seen from the driver seat. Also, since the distance L2 is generated between the meter 11 and the outside view display 13 when the outside view display 13 on the driver seat side is seen from the driver seat, and the steering 15 is located at the portion of the distance, hiding of the display region 13G with the steering 15 is curbed.

In the embodiment, since the gripping portion 15A of the steering 15 is located between the outer end in the vehicle width of the display region 11G of the meter 11 and the vehicle width inner portion of the display region 13G of the right outside view display 13 (in the distance L2) for the driver seat, a probability that the display region 13G is hidden by hands of the driver who grips the steering 15 decreases.

In the embodiment, since appearances of the pair of cover members 5K and 13K have left-right inverted symmetric shapes, it is possible to unify left and right designs and also to realize both visibility of the outside view displays 5 and 13 and a sense of unity of the outside view display 5 and the left display audio 7 and a sense of unity of the outside view display 13 and the meter 11.

In the embodiment, since the lower end of the display region 5G of the left outside view display 5 is located above the lower end of the display region of the left display audio 7, and the lower end of the display region 13G of the right outside view display 13 is located above the lower end of the display region of the meter 11, the display regions 5G and 13G of the outside view displays 5 and 13 are located further above the steering 15.

Therefore, it is possible to reduce the probability that the display regions 5G and 13G of the outside view displays 5 and 13 are hidden with hands of the passenger.

In the embodiment, since the indicator 17 is provided below the left outside view display 5, it is possible to reduce a probability that light from the left display audio 7 enters the indicator 17. Therefore, a probability that the inside of the indicator 17 is seen through is reduced, and it is possible to easily recognize whether or not the indicator 17 is turned on.

Similarly to the above description, since the indicator 17 is provided below the right outside view display 13, it is possible to reduce a probability that light from the meter 11 enters the indicator 17. Therefore, a probability that the inside of the indicator 17 is seen through is reduced, and it is possible to easily recognize whether or not the indicator 17 is turned on.

Although the invention has been described above on the basis of the embodiment, the invention is not limited to the embodiment.

For example, types of the respective devices, such as the left display audio 7, the right display audio 9, and the meter 11, which are disposed between the left and right outside view displays 5 and 13, and order of disposition thereof are not limited those in the embodiment.

Although a vehicle provided with a right steering 15 has been described, a left-right inverted symmetric shape may be employed for a vehicle provided with a left steering.

REFERENCE SIGNS LIST 1 instrument panel
5 left outside view display
7 left display audio (display)
9 right display audio (display)
11 meter (display)
13 right outside view display
13B inner end
5G, 11G, 13G display region
5K, 13K cover member
15 steering
17 indicator

What is claimed is:

1. A disposition structure of a display on an instrument panel for a vehicle, comprising:
   a first outside view display having a first outside display region, a first display audio having a first display region, a second display audio having a second display region, a meter having a third display region, and a second outside view display having a second outside display region,
   the first outside view display, the first display audio, the second display audio, the meter, and the second outside view display being disposed successively on the instrument panel in this order from one vehicle outermost end to another vehicle outermost end along a vehicle width direction,
   the first outside view display, the first display audio, the second display audio, the meter, and the second outside view display are arranged along a substantially straight line as seen from a driver seat side and a front passenger seat side,
   the first outside view display and the second outside view display are located outside a steering in the vehicle width direction,
   the first outside display region and the second outside display region are provided so as to face an inside in the vehicle width direction and display captured outside view images,
   the first display audio, the second display audio, and the meter are disposed on a substantially straight line in a top view and configure a display,
   the display extends from a proximity of an inner edge of the first outside view display that is disposed at the one vehicle outermost end in the vehicle width direction to a proximity of an inner edge of the second outside view display that is disposed at the other vehicle outermost end in the vehicle width direction, with display regions of the display extending from a driver seat to a front passenger seat,
   an inner end, in the vehicle width direction, of the first outside display region of the first outside view display is disposed such that the inner end is located on a front side of the vehicle relative to an outer end, in the vehicle width direction, of the first display region of the first display audio that is proximate to the first outside view display, and
   an inner end, in the vehicle width direction, of the second outside display region of the second outside view display is disposed such that the inner end is located on the front side of the vehicle relative to an outer end, in the vehicle width direction, of the third display region of the meter that is proximate to the second outside view display.

2. The disposition structure of a display on the instrument panel for a vehicle according to claim 1, wherein the first outside display region of the first outside view display and the second outside display region of the second outside view display are provided outside left and right ends of the display in the vehicle width direction at distances from the left and right ends, respectively.

3. The disposition structure of a display on the instrument panel for a vehicle according to claim 2, a gripping portion of the steering is located between a vehicle width outer end of the first, second, and third display regions of the display and a vehicle width inner portion of one of the first and second outside display regions of one of the first and second outside view displays proximate to the driver seat.

4. The disposition structure of a display on the instrument panel for a vehicle according to claim 1,
   wherein the first and second outside view displays include cover members that cover surroundings of the first and second outside display regions of the first and second outside view displays, respectively, and appearances of the cover members have left-right inverted shapes.

5. The disposition structure of a display on the instrument panel for a vehicle according to claim 1, wherein lower ends of the first and second outside display regions of the first and second outside view displays are each disposed so as to be located above a lower end of the first, second, and third display regions of the display.

6. The disposition structure of a display on the instrument panel for a vehicle according to claim 5, wherein indicators that include light emitting sections on rear surfaces and display information by the light emitting sections emitting light are provided below the first and second outside view displays, respectively.

7. The disposition structure of a display on the instrument panel for a vehicle according to claim 1, wherein the first and second outside display regions of the first and second outside view displays are configured such that angles that are directed to the driver seat can be adjusted through an operation of a switch.

* * * * *